United States Patent
Ito et al.

(10) Patent No.: US 7,283,510 B2
(45) Date of Patent: Oct. 16, 2007

(54) WIRELESS RECEIVER ESTIMATING POWER OF INTERFERENCE

(75) Inventors: Akira Ito, Kawasaki (JP); Masahiko Shimizu, Kawasaki (JP); Koji Matsuyama, Kawasaki (JP); Yoji Sugawara, Kawasaki (JP); Shunji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 10/300,510

(22) Filed: Nov. 20, 2002

(65) Prior Publication Data

US 2003/0153277 A1 Aug. 14, 2003

(30) Foreign Application Priority Data

Feb. 14, 2002 (JP) ............................. 2002-036814

(51) Int. Cl.
*H04J 3/16* (2006.01)
(52) U.S. Cl. ...................... 370/346; 370/310; 370/318; 370/319; 370/320; 370/345; 370/491; 370/500
(58) Field of Classification Search ..................... None
See application file for complete search history.

(56) References Cited

U.S. PATENT DOCUMENTS

| | | | | |
|---|---|---|---|---|
| 6,028,894 | A * | 2/2000 | Oishi et al. .................. | 375/227 |
| 2002/0159549 | A1* | 10/2002 | Aoyama et al. ............ | 375/346 |
| 2002/0196871 | A1* | 12/2002 | Nishio et al. ................ | 375/322 |
| 2003/0099306 | A1* | 5/2003 | Nilsson et al. .............. | 375/316 |

FOREIGN PATENT DOCUMENTS

| | | |
|---|---|---|
| CN | 1256817 | 6/2000 |
| EP | 1 176 730 | 1/2002 |
| JP | 9-284205 | 10/1997 |
| JP | 11-2651 | 1/1999 |
| JP | 2000-49700 | 2/2000 |
| JP | 2001-24623 | 1/2001 |
| JP | 2001-25057 | 1/2001 |
| JP | 2001-244914 | 9/2001 |
| JP | 2001-308824 | 11/2001 |
| JP | 2002-26796 | 1/2002 |
| JP | 2004-517552 | 6/2004 |
| WO | 99/43101 | 8/1999 |

(Continued)

OTHER PUBLICATIONS

Chinese Office Action dated Apr. 2, 2004 for corresponding Chinese Patent Application No.: 02156804.9.

(Continued)

*Primary Examiner*—Duc M. Nguyen
*Assistant Examiner*—Matthew W. Genack
(74) *Attorney, Agent, or Firm*—Katten Muchin Rosenman LLP

(57) ABSTRACT

By providing a interference power estimation unit obtaining the power of interference in a common pilot signal with ten symbols in one slot and outputting the power of interference as the estimate of the amount of interference in the data signal's pilot signal and a signal-to-interference power ratio calculation unit calculating a signal-to-interference power ratio (SIR) using an output of the interference power estimation unit, in a spread spectrum communication method, a correct SIR can be estimated even when the number of symbols of an individual pilot signal in the slot of the data channel is small.

8 Claims, 12 Drawing Sheets

FOREIGN PATENT DOCUMENTS

WO     WO 02/054638     7/2002

OTHER PUBLICATIONS

European Search Report dated May 27, 2005.

Masafumi Usuda, et al. Optimizing the Number of Dedicated Pilot Symbols for Forward Link in W-CDMA Systems. IEEE Vehicular Technology Conference, May 15, 2000, XP-000968378.

Notice of Rejection Grounds dated Mar. 14, 2006 and Oct. 24, 2006.

\* cited by examiner

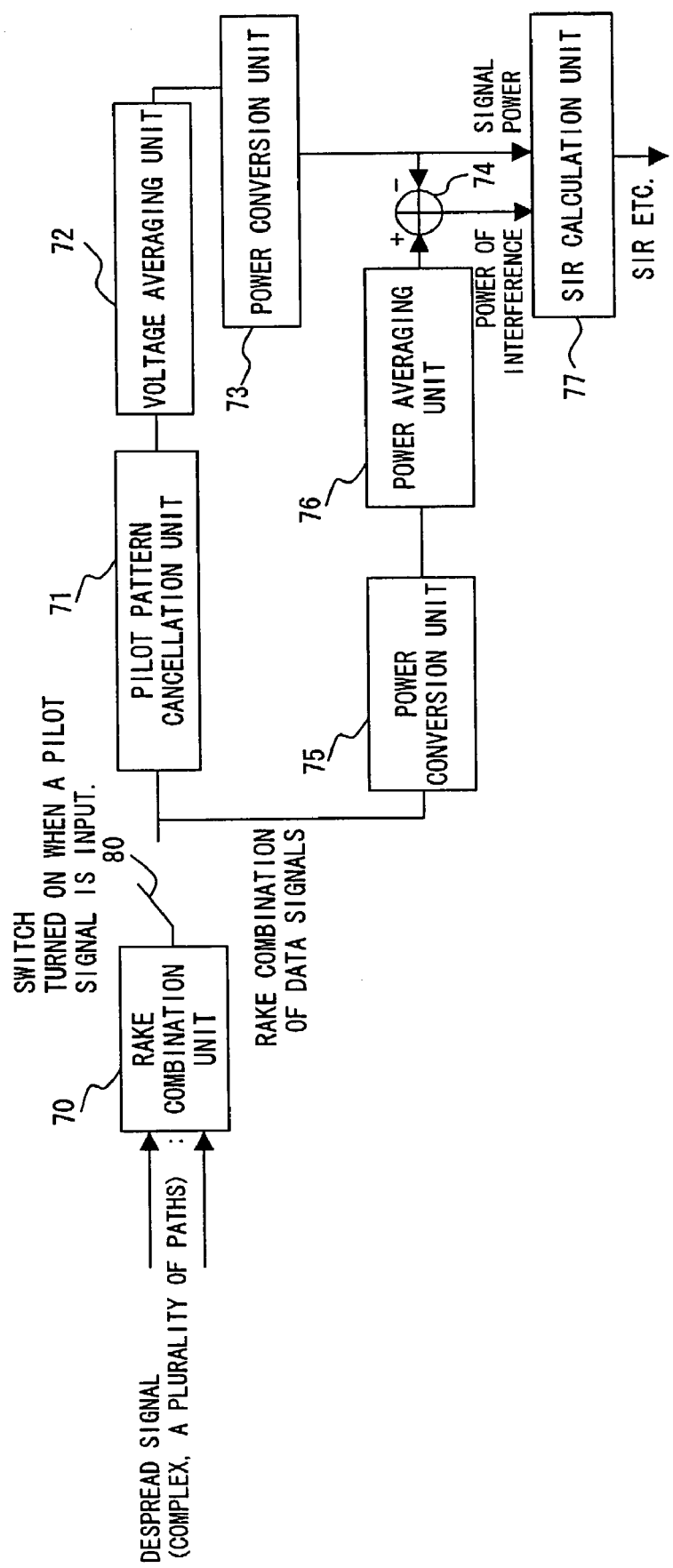
F I G. 1 A

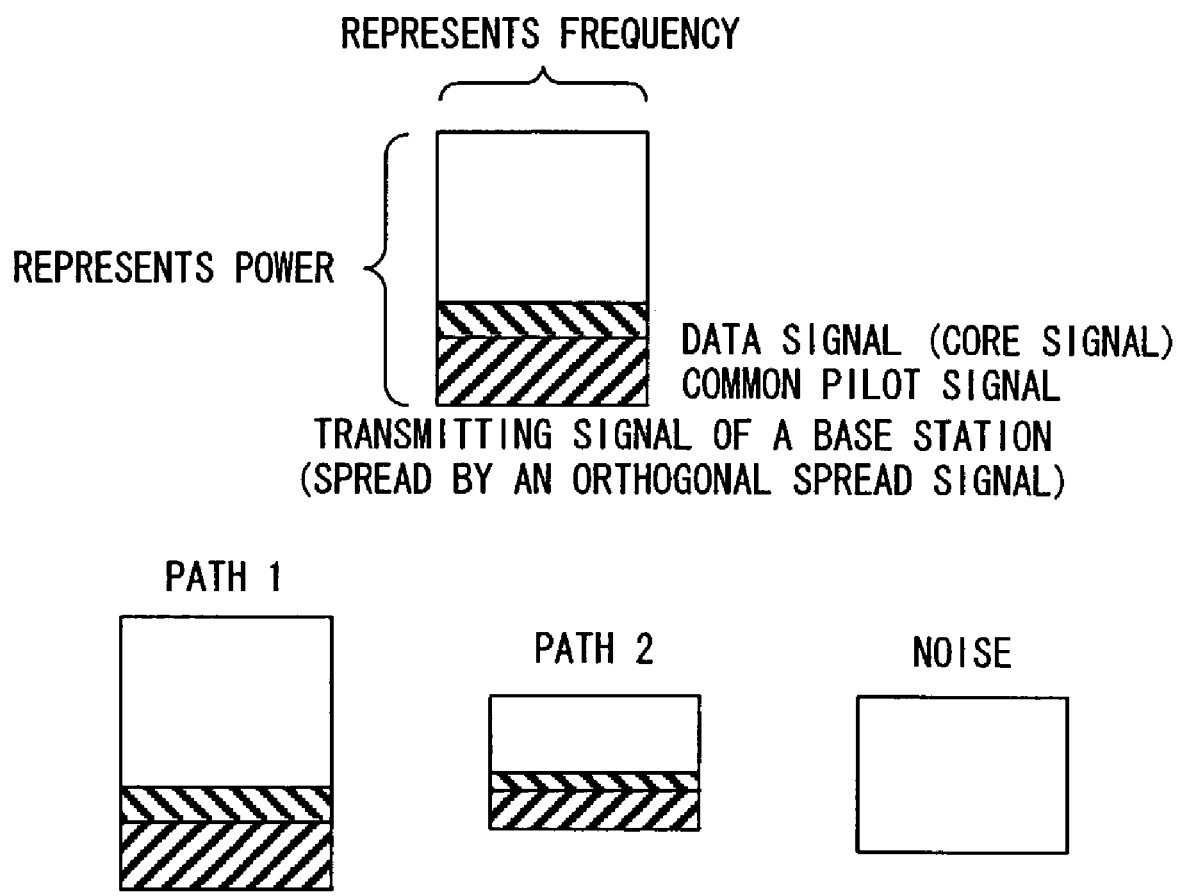
F I G. 4

| CPICH | PILOT | |
|---|---|---|

| DPCH | DATA | PILOT |
|---|---|---|

FIG. 6

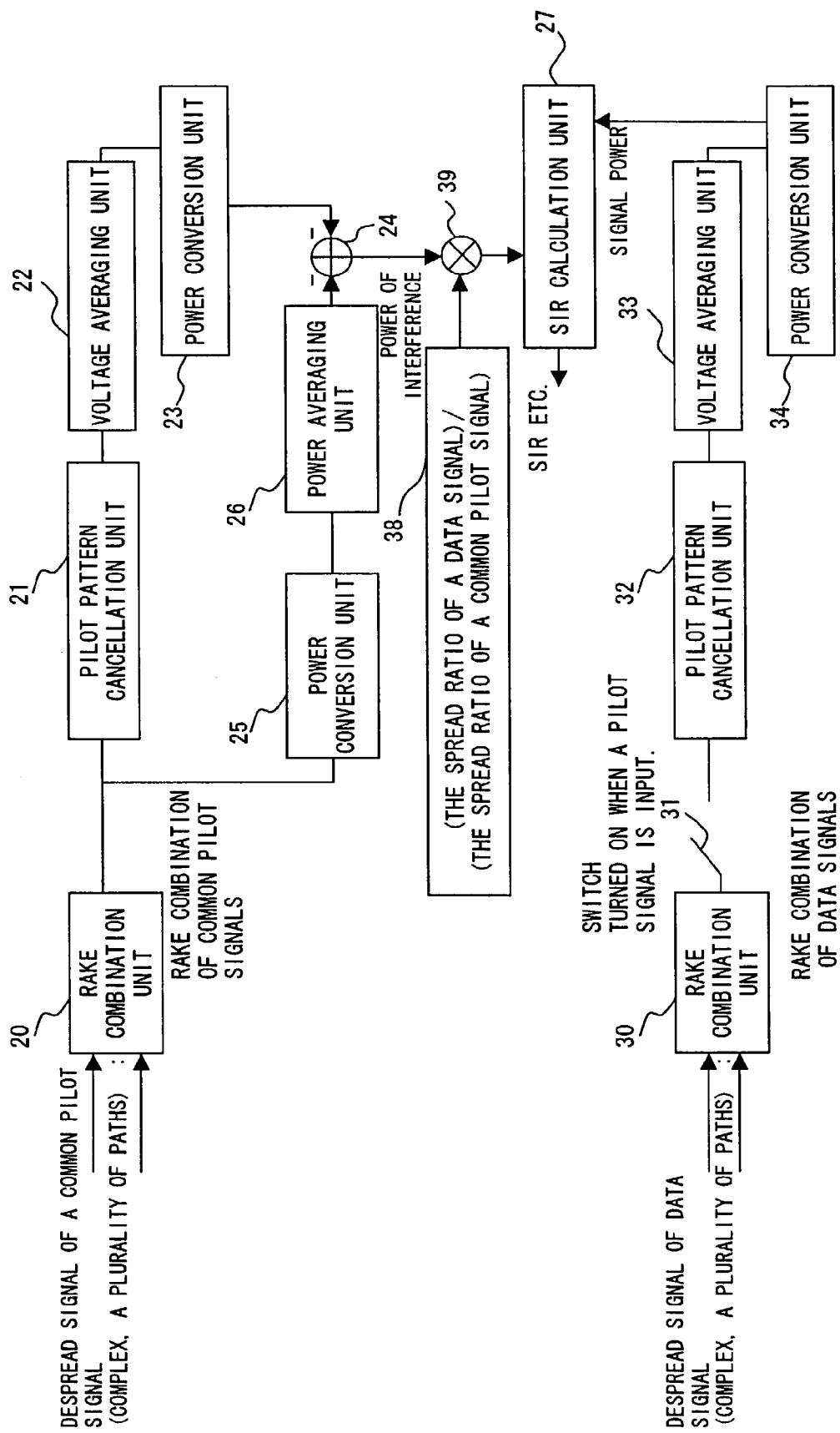
F I G. 7

WIRELESS RECEIVER ESTIMATING POWER OF INTERFERENCE

BACKGROUND OF THE INVENTION

1. Field of the Invention

The present invention relates to a mobile communication method, and more specifically, it relates to a wireless receiver estimating the power of interference in order to control the transmitting power of a base station.

2. Description of the Related Art

Spread spectrum communication systems are widely used as a fundamental technology of mobile communications.

In a direct spread (DS) method as the simplest model of spread spectrum communication, a data signal to be transmitted is modulated using a PN signal with chip width $T_c$ of approximately $1/100$ to $1/1000$ of its cycle (bit width) T as a spread signal, that is, its spectrum is spread by multiplying the data signal by the PN signal, and is transmitted to a receiver.

The receiver despreads the signal buried in noise and extracts symbols from the signal. To despread basically means to demodulate an incoming signal by multiplying the incoming signal by the same PN signal with the same phase as that of the incoming signal.

In code division multiplex access (CDMA), which is one typical spread spectrum communication method, since the signals of individual channels interfere with one another, a receiver can estimate the signal-to-interference power ratio (SIR) of an incoming signal and a base station can control the transmitting power, based on the result. In this case, channel capacity can be increased by communicating with the minimum necessary transmitting power. SIR estimation is a major technology of a CDMA system.

Specifically, according to the result of the SIR estimation of the receiver, if the signal power is sufficiently high compared to the power of interference, transmitting power is reduced by this technology in the base station. If it is low, transmitting power is increased. FIG. 1A shows the configuration of a conventional power measurement unit of a receiver conducting such a SIR estimation.

FIG. 1A shows the configuration of the level measurement unit of a rake receiver. A rake receiver combines signals received with a variety of delay times in a multi-path environment where there are many reflected waves besides direct waves transmitted from a transmitter. In such a receiver, conventionally, the SIR estimation of an incoming channel, that is, a data channel, is conducted in order to control its transmitting power in the base station, using its individual pilot signal.

In FIG. 1A, the resulting multi-path signals combined by a rake combination unit 70 are input to a pilot pattern cancellation unit 71 through a switch 80 that is turned on only when a pilot signal is output, and its pilot pattern is cancelled. Then, the power of a core signal, the interference element of which is eliminated by a voltage averaging unit 72 and a power conversion unit 73, that is, a signal to be obtained by despreading is obtained.

The signal input from the switch 80 is simultaneously converted into power by a power conversion unit 75 and a power averaging unit 76, the average power of a plurality of symbols is calculated, and the respective power of the core signal and interference element are totaled. Then, a subtracter 74 calculates the power of interference by subtracting the output of the power conversion unit 73 from the output of the power averaging unit 76. Then, the power of interference is input to an SIR calculation unit 77 together with the core signal power, being the output of the power conversion unit 73, and an SIR is estimated using the core signal power and the power of interference.

However, as described with reference to FIG. 1A, according to the conventional method for estimating a SIR using the data channel's pilot signal, if the number of pilot symbols in the slot of an individual data channel is small, its interference element cannot be thoroughly eliminated by simply averaging the pilot symbols, and accordingly, the power of the core signal cannot be accurately obtained, which is a problem.

FIG. 1B shows this problem. FIG. 1B shows an example of a signal point obtained by canceling the pilot pattern if there are only two pilot symbols in one slot.

The first and second symbols of a measured signal point are located at places marked with a circle and the true signal point is marked with × on the phase plane of QPSK. When a signal point is calculated by averaging these points, it is located away from the true signal point. In particular, if the number of pilot symbols is one, an average cannot be obtained, and the power of the core signal cannot be obtained by simply using pilot symbols, accordingly.

If the number of pilot symbols is small, its data can be temporarily judged by the prior art, and the respective power of the core signal and the power of interference can also be obtained by increasing the number of symbols to be averaged. If interference is weak and the result of the temporary judgment is accurate, it is valid. However, if interference is strong, the result of the temporary judgment is inaccurate, and accurate core signal power and the power of interference cannot be obtained. In this way, if the number of pilot symbols in the slot of a data signal is small, a correct SIR cannot be estimated, which is another problem.

SUMMARY OF THE INVENTION

It is an object of the present invention to estimate a correct signal-to-interference power ratio (SIR) by obtaining the power of interference in a common pilot signal instead of using the data channel's pilot signal and using the obtained value as the estimate of the amount of interference in the pilot signal of the data channel to solve the problems described above.

In order to achieve the object described above, the wireless receiver estimating the power of interference in an incoming data signal of the present invention comprises an interference power estimation unit obtaining the power of interference in a common pilot signal and outputting the power of interference as the estimate of the amount of interference in the data channel's pilot signal.

Another wireless receiver estimating the power of interference in the present invention comprises an interference power estimation unit obtaining the power of interference in a common pilot signal and outputting the power of interference as the estimate of the amount of interference in the data channel's pilot signal; a data channel interference power calculation unit calculating the power of interference in the pilot signal of the data channel; a switch unit outputting the output of the interference power estimation unit when the number of pilot symbols in one slot of a data channel is small and outputting the output of the data channel interference power estimation unit; and a signal-to-interference power ratio (SIR) calculation unit calculating the SIR of a data signal using the output of the switch unit.

Another wireless receiver estimating the power of interference in the present invention comprises an interference power estimation unit obtaining the power of interference in a common pilot signal and outputting the power of interference as the estimate of the amount of interference in the data channel's pilot signal; a data channel interference power calculation unit calculating the power of interference in the pilot signal of the data channel; a weight averaging unit averaging the respective weights of the output of the interference power estimation unit and the output of the data channel interference power calculation unit; and a signal-to-interference power ratio (SIR) calculation unit calculating the SIR of a data signal using the output of the weight averaging unit.

BRIEF DESCRIPTION OF THE DRAWINGS

FIG. 1A shows the configuration of a conventional power measurement unit;

FIG. 4 shows the respective incoming signals in paths 1 and 2 of a receiver;

FIG. 6 shows the respective slot formats of a common pilot signal and a data signal;

FIG. 7 shows the configuration of a power measurement unit correcting the difference in a spread ratio between a common pilot signal and a data signal;

DESCRIPTION OF THE PREFERRED EMBODIMENTS

Figure 2A:
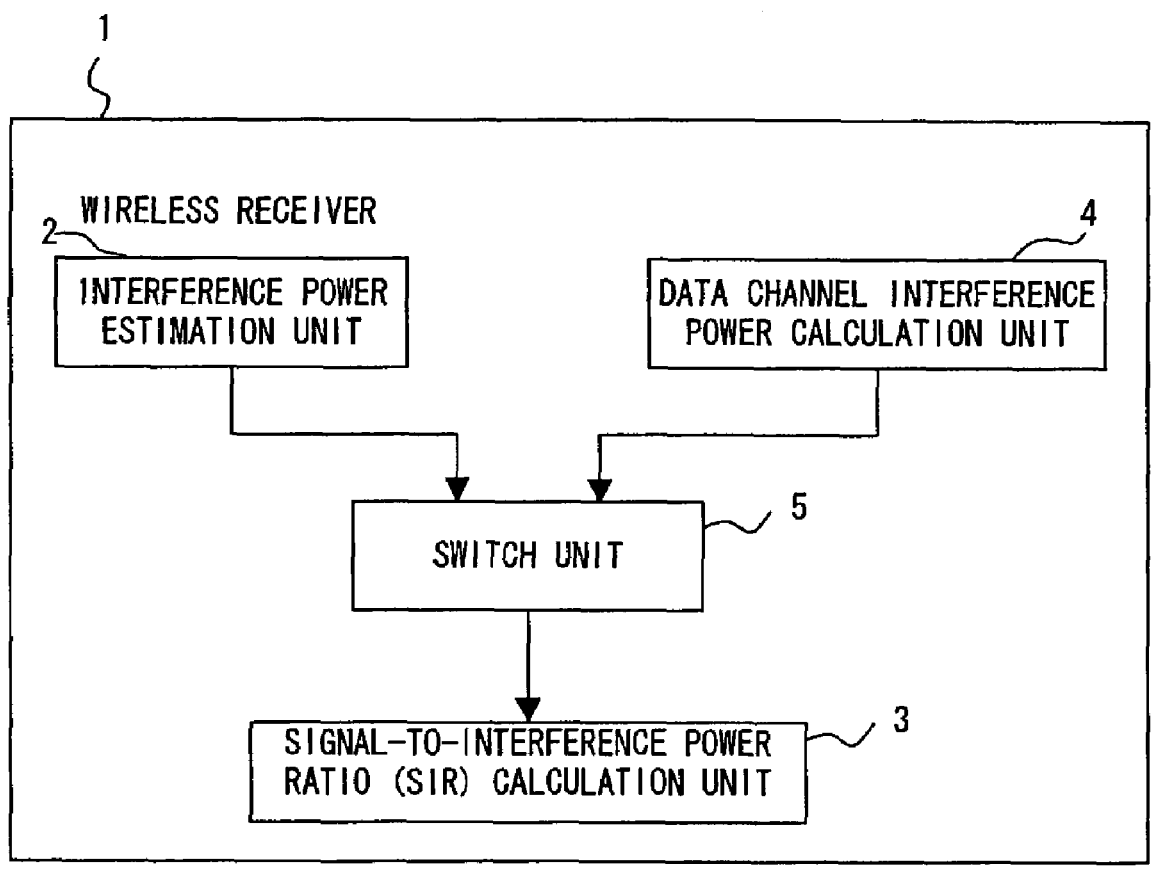
FIG. 2A shows the basic configuration of the wireless receiver of the present invention.

FIG. 2A shows the basic configuration of the wireless receiver of the present invention. FIG. 2A shows the configuration of a wireless receiver 1 estimating the power of interference in an incoming signal. The wireless receiver 1 comprises at least an interference power estimation unit 2.

The interference power estimation unit 2 obtains the power of interference in a common pilot signal and outputs the obtained interference value as the estimate of the amount of interference in the data channel's pilot signal. A signal-to-interference power ratio (SIR) calculation unit 3 calculates the SIR of the data signal using the interference power estimation unit 2.

Another wireless receiver 1 estimating the power of interference in the present invention further comprises a data channel interference power calculation unit 4, a switch unit 5 and a signal-to-interference power ratio (SIR) calculation unit 3 in addition to the interference power estimation unit 2.

The data channel interference power calculation unit 4 calculates the power of interference in the data channel's pilot signal. The switch unit 5 outputs the output of the interference power estimation unit 2 when the number of pilot symbols in one slot of a data channel is, for example, 1 or 2, and outputs the output of the data channel interference power calculation unit 4 when the number of the pilot symbols is, for example, more than 2. The signal-to-interference power ratio (SIR) calculation unit 3 calculates the SIR of a data signal, using the output of the switch unit 5.

According to this configuration, if the number of pilot symbols in the slot of a data channel is large and if a correct SIR value can be estimated even when an SIR is estimated using the data channel's pilot signal, the SIR can be estimated using the output of the data channel interference power calculation unit estimating the power of interference in the data channel's pilot signal.

Another wireless receiver estimating the power of interference in the present invention further comprises a weight averaging unit and SIR estimation unit in addition to the interference power estimation unit and data channel interference power calculation unit.

The weight averaging unit averages the respective weights of the output of the interference power estimation unit and that of the data channel interference power calculation unit. The signal-to-interference power ratio (SIR) calculation unit estimates the SIR of a data signal, using the output of the weight averaging unit.

According to this configuration, a correct SIR value can be estimated by increasing weight for the output of the interference power estimation unit if the number of pilot symbols in the slot of a data channel is small and by increasing weight for the output of the data channel interference power calculation unit if the number of pilot symbols in the slot of a data channel is large.

In the preferred embodiment of the present invention, the interference power estimation unit of the receiver of the present invention can also multiply the power of interference in a pilot signal by a quotient obtained by dividing the spread ratio of a data signal by the spread ratio of a common pilot signal and can output the product as the estimate of the amount of interference in the data channel's pilot signal.

In the preferred embodiment, each wireless receiver further comprises a common pilot signal despread unit despreading the common pilot signal using the spread ratio of the data signal, and the interference power estimation unit can also calculate the interference power of the common pilot signal using the output of the common pilot signal despread unit.

As described above, according to the present invention, an SIR can be calculated using the power of interference in a common pilot signal as the estimate of the amount of reference in the data channel's pilot signal.

Figure 2B:
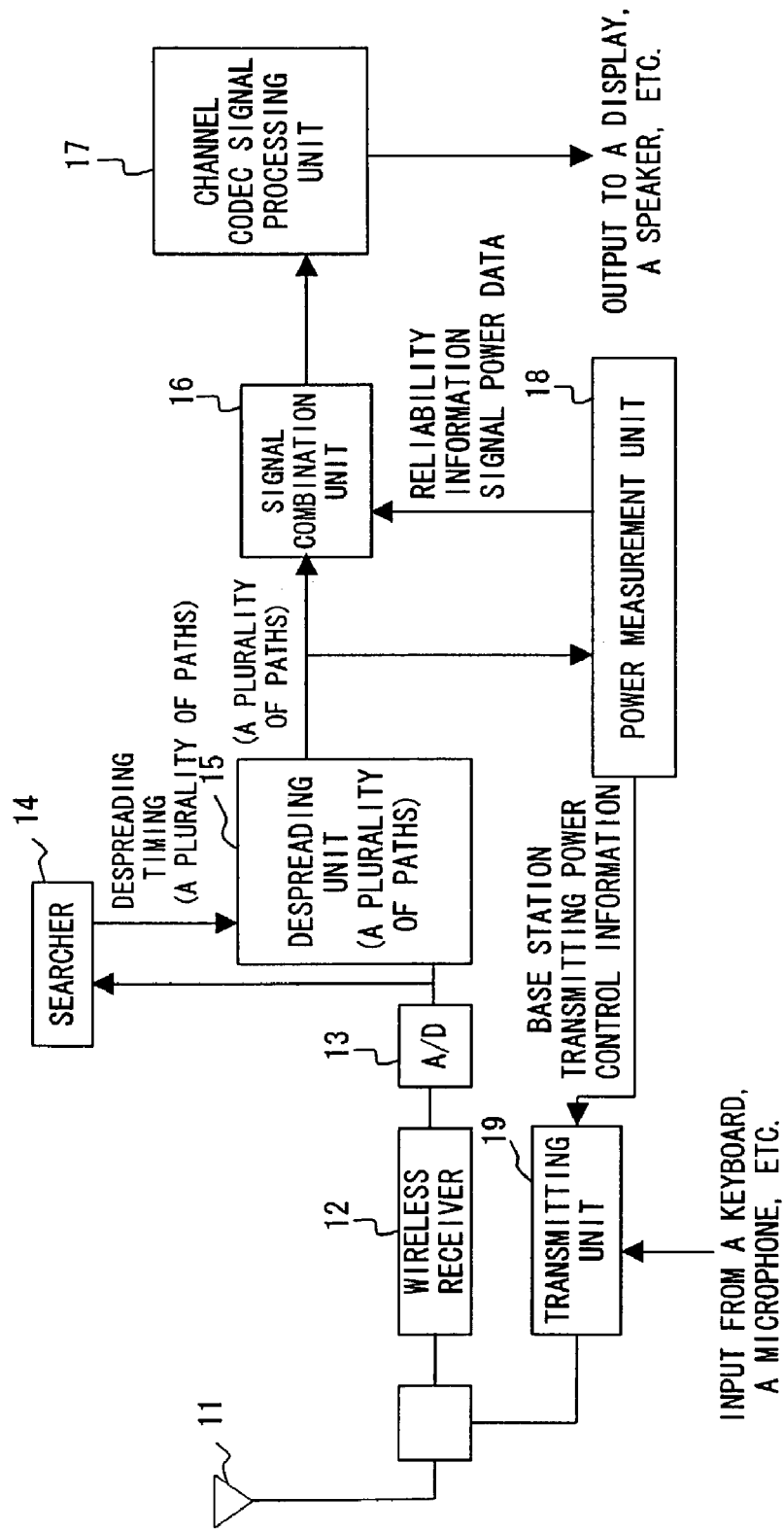
FIG. 2B shows the entire configuration of the receiver in the preferred embodiment of the present invention.

FIG. 2B shows the entire configuration of the receiver in the preferred embodiment of the present invention. FIG. 2B shows the configuration of a rake receiver used in the multi-path environment described earlier, and also shows the configuration of a receiver with a power measurement unit estimating an SIR value and providing information for controlling the transmitting power of a base station.

In FIG. 2B, a receiver comprises an antenna 11, a wireless receiving unit 12; an A/D conversion unit 13; a searcher 14 searching each path of a multi-path and outputting despread timing for the plurality of paths; a despreading unit 15 despreading the output of the A/D converter 13 using the despread timing; a signal combination unit 16 combining the outputs of the despreading unit 15 using a rake method; a signal processing unit 17, such as a channel codec and the like, receiving the output of the signal combination unit 16 and outputting the incoming signal to a display, a speaker and the like; a power measurement unit 18 conducting the SIR estimation described earlier; and a transmitting unit 19 transmitting input from a keyboard or a microphone, or transmitting power control information addressed to a base station.

Figure 3:
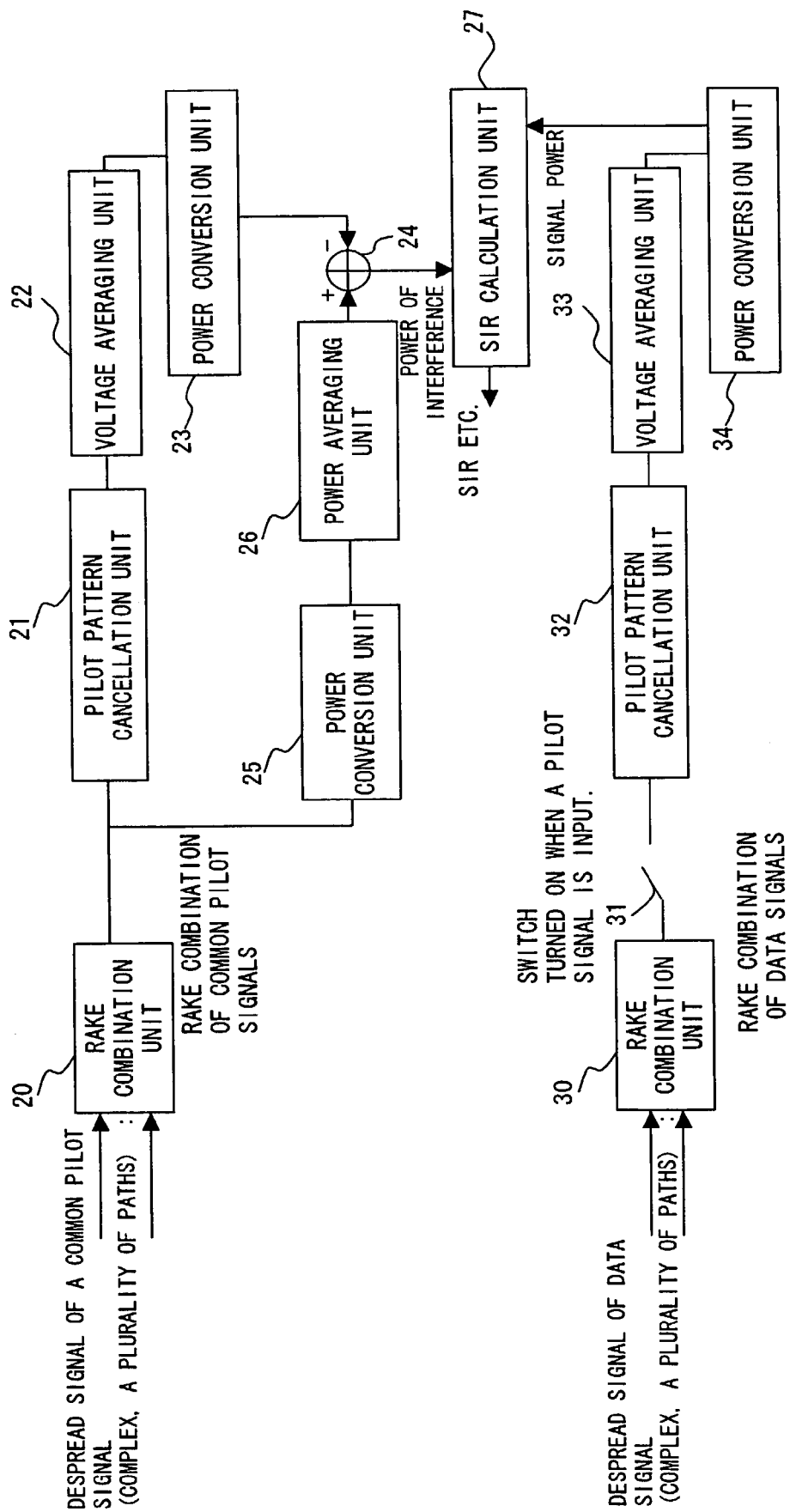
FIG. 3 shows the configuration of the power measurement unit shown in FIG. 2B.

FIG. 3 shows the detailed configuration of the power measurement unit shown in FIG. 2B. In FIG. 3, a rake combination 20, a pilot pattern cancellation unit 21, a voltage averaging unit 22, a power averaging unit 23, a subtracter 24, a power conversion unit 25 and a power averaging unit 26 obtain the power of interference in a common pilot signal, and a rake combination unit 30, a switch 31, a pilot pattern cancellation unit 32, a voltage averaging unit 33 and a power conversion unit 34 obtain the signal power of a data signal.

First, a despread signal for a common pilot signal is input to rake combination unit 20 for each path of a multi-path, and the rake combination of the common pilot signals is supplied to a pilot pattern cancellation unit 21 and a power conversion unit 25.

After the pilot cancellation unit 21 cancels the pilot pattern of the signal, the signal is input to a voltage averaging unit 22, and, for example, the respective voltages of ten pilot pattern symbols in one slot of a common pilot signal are averaged. Then, the averaged voltage is converted into power equivalent to a squared voltage, by a power conversion unit 23, and is supplied to a subtracter 24.

The rake combination of the common pilot signals that is supplied to the power conversion unit 25 is also converted into power, the respective power of the ten symbols described above is averaged by a power averaging unit 26 and the average power is supplied to the subtracter 24. The output of the power conversion unit 23 corresponds to the power of the core signal of a common pilot signal, and by subtracting the power from the output of the power averaging unit 26, the power of interference in the common pilot signal is obtained and supplied to an SIR calculation unit 27.

The despread data signal is also supplied to a rake combination unit 30 for each path of a multi-path and the rake combination of data signals can be obtained. A switch 31 is turned on when a pilot signal is input, and a pilot pattern cancellation unit 32 cancels the pilot pattern of the data channel's pilot signal. Then, the voltage of the pilot signal is converted into power by a voltage averaging unit 33 and a power conversion unit 34, and is supplied to an SIR calculation unit 27 as the signal power of the data channel.

The SIR calculation unit 27 uses the output of the subtracter 24, that is, the power of interference in the common pilot signal as the estimate of the amount of interference in the pilot signal of the data channel and calculates an SIR estimation value, based on the value and the signal power value output by the power conversion unit 34.

Figure 1B:
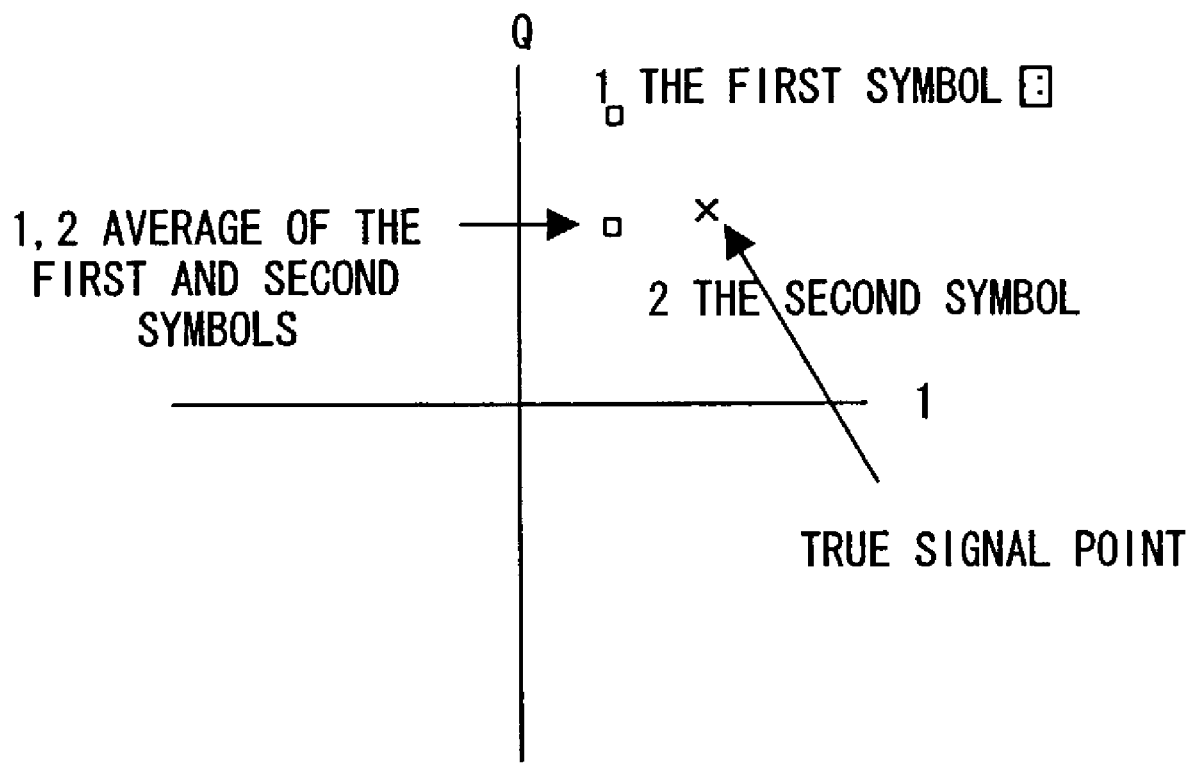
FIG. 1B shows the discrepancy between signal points generated when the number of pilot symbols in the slot of a data channel is small.

As described above, in this preferred embodiment, basically, an SIR is estimated by using the power of interference in a common pilot signal as the estimate of the amount of interference in the data channel's pilot signal. As described later with reference to FIG. 6, ten symbols are always stored in one slot of a common pilot channel, and the signal point discrepancy problem due to the shortage of symbols described with reference to FIG. 1B can be avoided.

Figure 5:
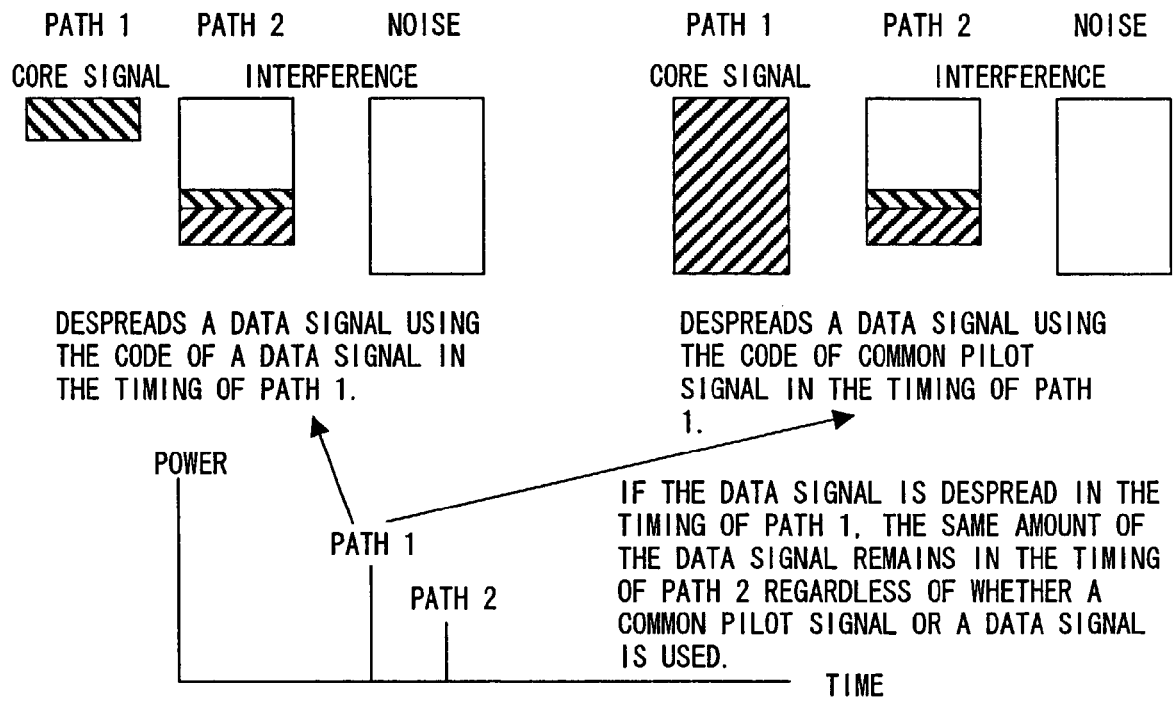
FIG. 5 shows respective average powers of interference obtained when a data signal is despread by the code of a data signal and when it is despread by the code of a common signal pilot.

By using the power of interference in a common pilot signal too, an SIR equivalent for that obtained by using the power of interference in the pilot signal of an individual data channel can be obtained. FIGS. 4 and 5 show the process.

FIG. 4 shows the incoming signal to mobile equipment in a CDMA communication system, that is, a receiver. In this down-channel, usually signals are spread using an orthogonal spread code and the spread signals of a plurality of channels are simultaneously transmitted. The transmitted signals propagate through a multi-path fading environment, are received by mobile equipment and are despread.

FIG. 5 shows average power of interference obtained when a signal is despread by the code of a data signal and that is obtained when a data signal is despread by the code of a common pilot signal. In FIG. 5, by dispreading a signal in the timing of path 1 of paths 1 and 2, only a desired signal element remains as the element of path 1 due to the orthogonality of the despread code.

Since all the elements of path 2 remain as an interference element, the interference element obtained when a signal is despread in the timing of path 1 is determined by noise, including interference elements between all the signals in path 2 and another cell, and ideally the same average power of interference is obtained regardless of whether interference is suppressed using the code of either a common pilot signal or the data channel's pilot signal. Therefore, the same average power of interference is obtained regardless of whether the power of interference is estimated using a common pilot signal or the data channel's pilot signal.

Figure 6:
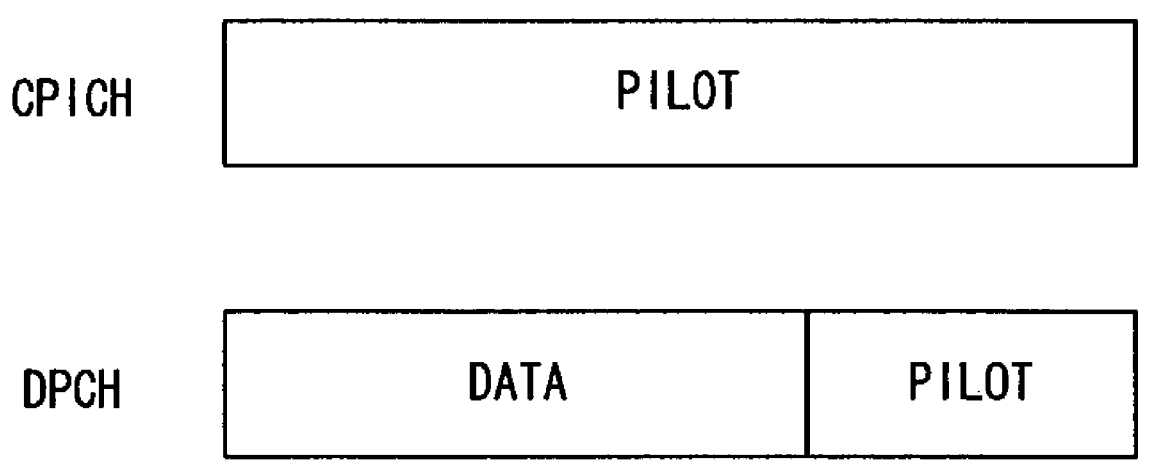

The reason why the power of interference in a common pilot signal can be used as the estimate of the amount of interference in the data channel's pilot signal is further described below. FIG. 6 shows the respective slot formats of the channel of a common pilot signal and the pilot channel of a data signal.

The upper shows the slot format of a common pilot channel (CPICH), and one slot, that is, all ten symbols are used as a common pilot. The lower shows the slot format of a dedicated physical channel (DPCH). In this case, when one slot is composed of ten symbols, for example, only two or four symbols are used as pilot symbols, and the remaining eight or six symbols are used as data symbols.

Here, assuming that one symbol is composed of the first chip through the SF-th chip, variables are defined as follows:

$S_{c,n}$: the n-th chip signal of CPICH
$C_{c,n}$: the n-th chip channelization code of CPICH
$S_{d,n}$: the n-th chip signal of DPCH
$C_{d,n}$: the n-th chip channelization code of DPCH
$S_{o,n}$: the n-th chip signal of other orthogonal channels
$C_{o,n}$: the n-th chip channelization code of other orthogonal channels If it is assumed that an amount obtained by multiplying the n-th chip incoming signal by a scrambling code is obtained according the following expression, the $I_n$ of the following expression is a deviation from the true signal and an average value obtained by squaring $I_n$ is an interference amount.

$$C_{c,n} \times S_{c,n} + C_{d,n} \times S_{d,n} + C_{o,n} \times S_{o,n} + I_n \qquad (1)$$

In this case, since in the signal of another path, the timing of a scrambling code deviates, the signal of another path can be considered to be random. Since the signal transmitted from another base station has a different scrambling code, the signal can also be considered to be random. $I_n$ can be obtained by adding thermal noise to those random signals signals, and $I_n$ can also be handled to be random.

If a data signal is despread using a DPCH code, signals other than DPCH, of expression (1) disappear due to their orthogonality, and the result of the despreading becomes as follows:

$$\sum_{SF}(Cd,n^* \times Cc,n \times Sc,n + Cd,n^* \times Cd,n \times \qquad (2)$$

$$Sd,n + Cd,n^* Co,n \times So,n + Cd,n^* \times In) =$$

$$Sd,n \times SF + \sum_{SF}(Cd,n^* \times In)$$

In the above equation, * indicates a complex conjugate.

If $S_{d,n} \times SF$ as a signal element is subtracted from the result, the amount of interference is obtained squaring and averaging expression (3).

$$\sum_{SF}(Cd,n^* \times In) \qquad (3)$$

If a data signal is despread using a CPICH code, signals other than CPICH, of expression (1) zero out due to their orthogonality, and the result of the despreading becomes as follows:

$$\sum_{SF}(Cc,n^* \times Cc,n \times Sc,n + Cc,n^* \times Cd,n \times Sd,n + \qquad (4)$$

$$Cc,n^* \times Co,n \times So,n + C,n^* n \times In) =$$

$$Sc,n \times SF + \sum_{SF}(Cc,n^* \times In)$$

If $S_{c,n} \times SF$ as a signal element is subtracted from the result, the amount of interference is obtained squaring and averaging expression (5).

$$\sum_{SF}(Cc, \quad n^* \times In) \qquad (5)$$

In this way, the difference in estimating an interference amount between using a DPCH and a CPICH is whether $I_n$ is multiplied by a DPCH channelization code or a CPICH channelization code. $I_n$ is random and in the multiplication by either channelization code, each bit value is simply multiplied by 1 or −1, the absolute value of which is 1. Therefore, the same average, interference amount can be obtained regardless of whether a DPCH or a CPICH is used.

In FIG. 3, it is assumed that the respective spread ratios of a common pilot signal and a data signal are the same and the power of interference in a common pilot signal is directly used instead of the power of interference in the data channel's pilot signal. However, the respective spread ratios of a common pilot signal and a data signal are different, the difference between their ratios must be taken into consideration.

If an adding process is performed in relation to the despreading, the voltage of a core signal element, the power of an interference element and an SIR are multiplied by a spread ratio. Since the power of interference means dispersion, an interference power ratio is equal to a spread ratio.

If the respective spread ratios of a common pilot signal and a data signal are different, the respective power of interference is proportionally different. Therefore, if the power of interference in the data channel's pilot signal is obtained, the amount of interference estimated using a common pilot signal must be modified by the difference in spread ratio between the common pilot signal and data signal.

FIG. 7 shows the configuration of a power measurement unit conducting such modification. The configuration shown in FIG. 7 differs from that shown in FIG. 3 only in the following point. It is assumed that the spread ratio of a common pilot signal and that of a data signal are $SF_p$ and $SF_d$, respectively. In this case, a multiplier 39 multiplies the power of interference obtained using a common pilot signal, that is, the output of the subtracter 24, by a quotient that is obtained by dividing the spread ratio of the data signal by the spread ratio of the common pilot signal, that is, $SF_d/SF_d$. Then, the multiplier 39 supplies the result to the SIR calculation unit 27. If spread ratios are multiples of 2, this multiplication can be realized by bit shift instead of multiplication by the multiplier 39.

If the respective spread ratios of a common pilot signal and a data signal are different, the multiplication of the output of the subtracter 24 by $S_{Fd}/S_{Fd}$ in the multiplier 39 shown in FIG. 7 can be omitted by despreading the common pilot signal in advance using the spread ratio of the data signal. For example, if the spread ratio of a data signal is lower than that of a common pilot signal, the common pilot signal can be divided and despread. If the spread ratio of a data signal is higher than that of a common pilot signal, a plurality of signals can be combined and despread taking into consideration that the pilot signals are known.

Figure 8:
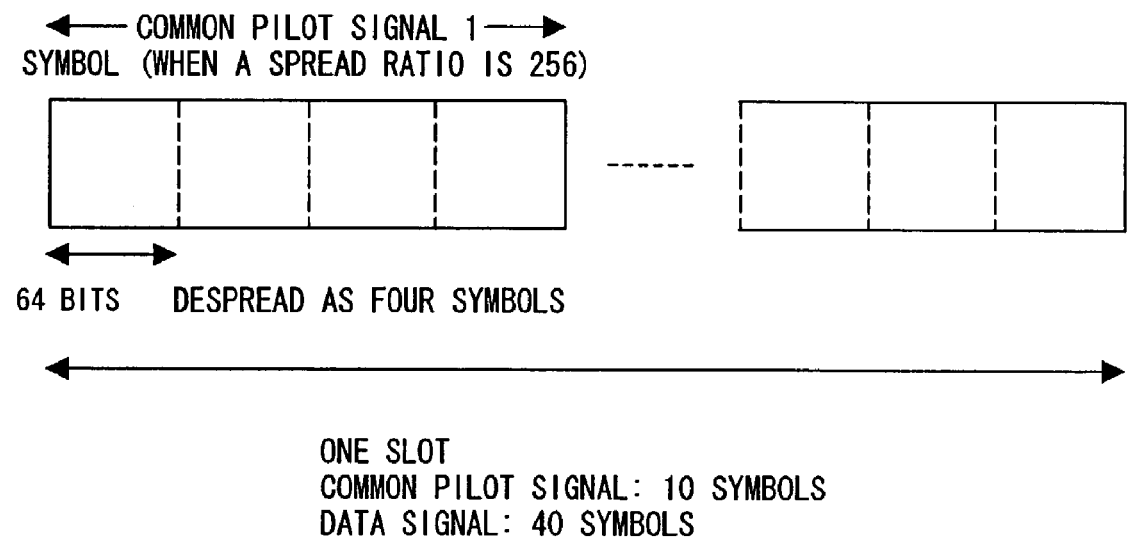
FIG. 8 shows the despreading of a common pilot signal using the spread ratio of a data signal.

FIG. 8 shows the despreading of a common pilot signal using the spread ratio of a data signal. In FIG. 8, the common spread ratio, the number of symbols in one slot and the spread ratio of a data signal are 256, 10 and 64, respectively. If the number of symbols in one slot is 40, the power of interference in a common pilot signal for 40 symbols per slot can be obtained by dividing one symbol of the common pilot signal by four units of 64 bits each.

As described above, if the power of interference in a common pilot signal is used as the interference power estimation value of the data channel's pilot signal, the respective signal power of the data signal and common pilot signal must be obtained and accordingly, the amount of calculation increases. Therefore, as described earlier, only when the number of pilot symbols in one slot of a data signal is small, such as 1 or 2, can the power of interference in the common pilot signal be used. When the number of pilot symbols is large, an SIR can also be estimated using only the pilot signal of a data signal as in the conventional method described with reference to FIG. 1A.

Figure 9:
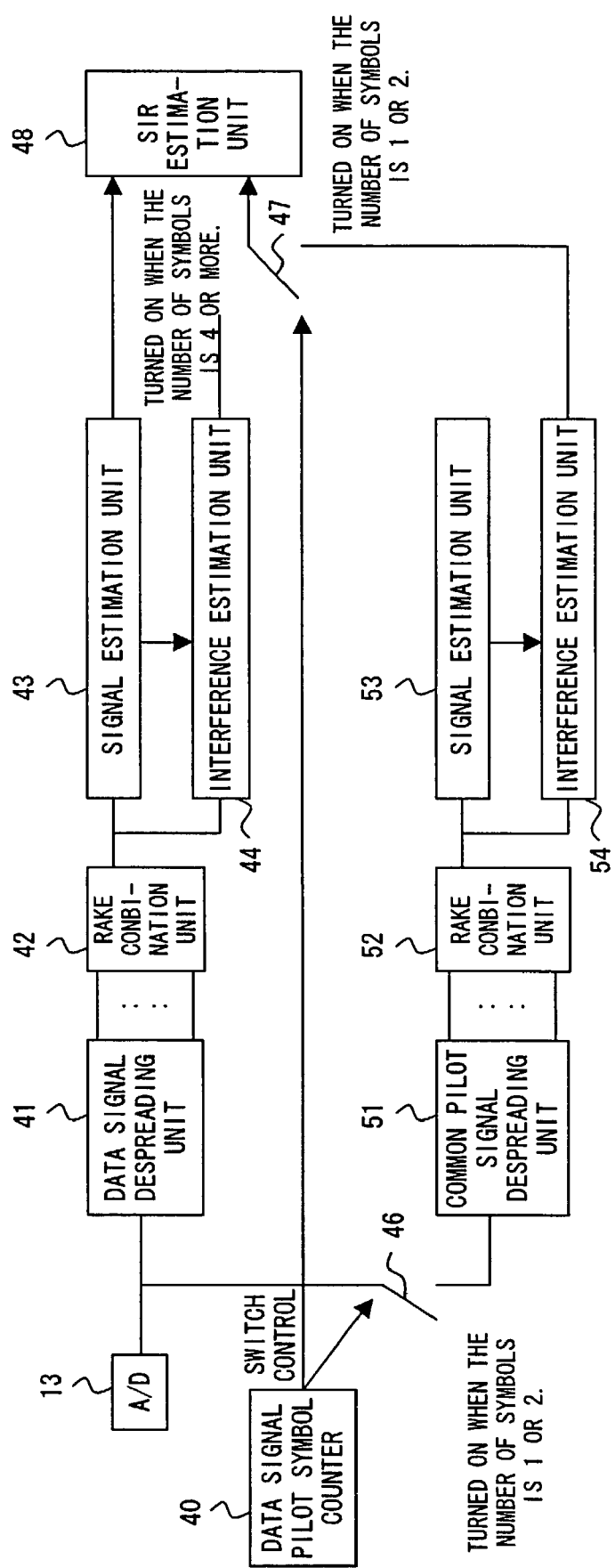
FIG. 9 shows the configuration of a power measurement unit switching over interference power calculation methods, based on the number of pilot symbols in the slot of a data channel.

FIG. 9 shows the configuration of a power measurement unit used in such a case. In FIG. 9, a data signal pilot symbol counter 40 switches over two switches 46 and 47, depending on whether or not the power of interference in a common pilot signal is used. In this case, since the number of data signal pilot symbols is basically reported from a base station, no special process for this judgment is needed. Reference numeral 13 represents an A/D converter. And a data signal despreading unit 41 despreads a data signal, and outputs the result of the despreading corresponding to each path of a multi-path.

In FIG. 9, a signal estimation unit 43 and an interference estimation unit 44 located in the upper section correspond to the conventional configuration shown in FIG. 1A. A rake combination unit 42 corresponds to the rake combination unit 70 shown in FIG. 1A, and the signal estimation unit 43 corresponds to the pilot pattern cancellation unit 71, voltage averaging unit 72 and power conversion unit 73 shown in FIG. 1A. The interference estimation unit 44 corresponds to the power conversion unit 75, power averaging unit 76 and subtracter 74 shown in FIG. 1A.

A common pilot signal despreading unit 51 despreads a common pilot signal, and outputs the result of the despreading corresponding to each path of a multi-path. A rake combination unit 52 located in the lower section of FIG. 9 corresponds to the rake combination unit 20 shown in FIG. 3, a signal estimation unit 53 corresponds to the pilot pattern cancellation unit 21, voltage averaging unit 22 and power conversion unit 23 shown in FIG. 3, an interference estimation unit 54 corresponds to the power conversion unit 25, power averaging unit 26 and subtracter 24 shown in FIG. 3.

In FIG. 9, the output of the signal estimation unit 43 is always supplied to an SIR estimation unit 48 as signal power. If the number of pilot symbols in one slot of a data channel is 1 or 2, the switch 47 is switched on and the output of the interference estimation unit 54 is output as the power of interference. If the number of pilot symbols is four or more, the switch 47 is switched on and the output of the interference estimation unit 44 is output as the power of interference.

Instead of switching over the power of interference to be supplied to the SIR estimation unit 48 depending on the number of pilot symbols in one slot of a data channel as shown in FIG. 9, the weights of the respective outputs of the interference estimation units 44 and 54 can also be averaged and be supplied to the SIR estimation unit 48 as the power of interference.

Figure 10:
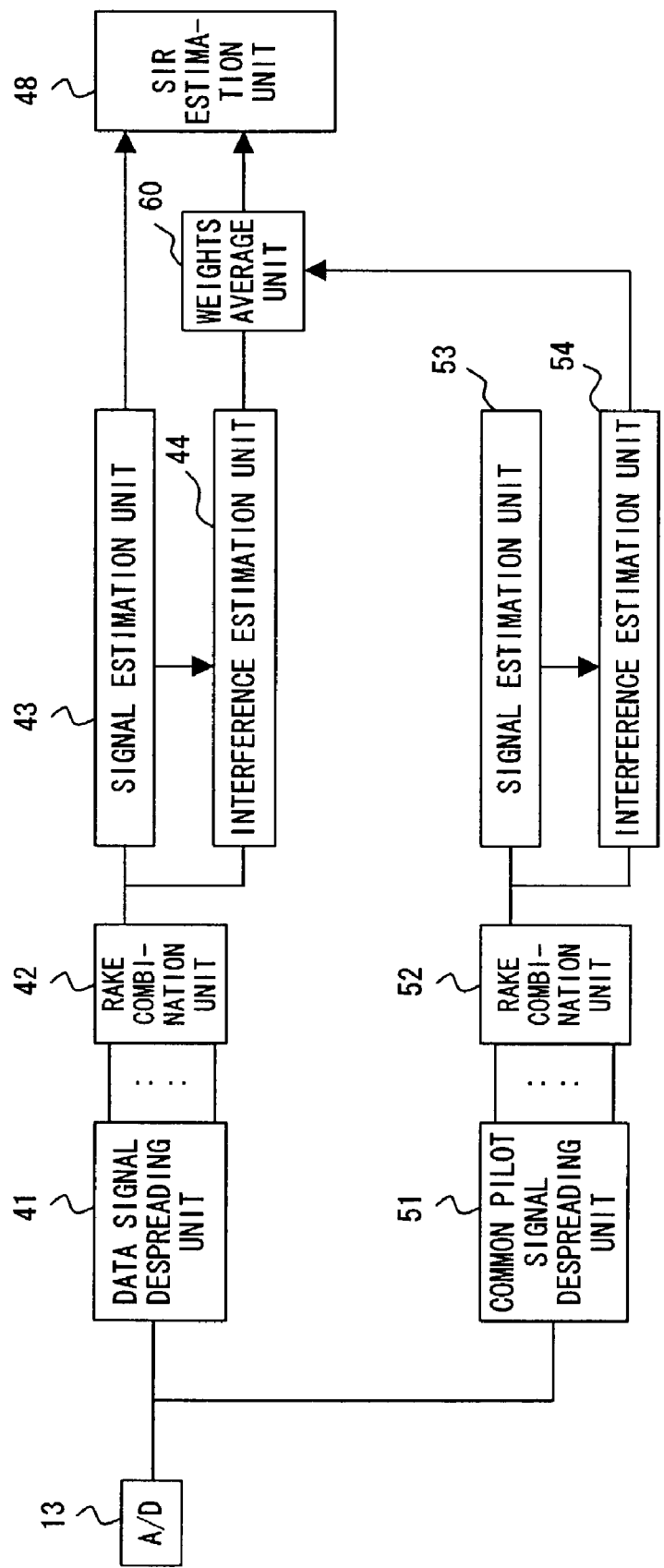
FIG. 10 shows the configuration of a power measurement unit averaging the respective weights of the powers of interference estimated using a common pilot signal and obtained using the data channel's pilot signal.

FIG. 10 shows the configuration of a power measurement unit with such a function. In FIG. 10, the power of interference, the weight of which is averaged by weight average unit 60 is used to estimate an SIR. For example, SIR estimation accuracy can be improved by heavily weighting the output of the interference estimation unit 54 if the number of pilot symbols in one slot of a data channel is small, and by lightly weighting it if the number of pilot symbols is large.

Although in the preferred embodiments described above, the power of interference and signal power are obtained using the rake combination of the path signals of a multi-path and an SIR is estimated using the power of interference and signal power, the present invention is not limited to such preferred embodiments. Alternatively, an SIR can be estimated by obtaining signal power and the power of interference for each path (finger) of a multi-path and combining them.

As described above, according to the present invention, by using the power of interference in a common pilot signal, as the estimation value of the data channel's pilot signal, a correct SIR can be calculated even when the number of pilot symbols in one slot of the data channel is small.

By switching over the estimation methods of the power of interference to be used to calculate an SIR according to the number of pilot symbols in one slot of a data channel, SIR estimation accuracy can be improved with little calculation.

What is claimed is:

1. A wireless receiver estimating power of interference in an incoming data signal, comprising:
    an interference power estimation unit obtaining power of interference in a common pilot signal and outputting the power of interference as an estimate of an amount of interference in a data channel's pilot signal;
    a data channel interference power calculation unit calculating power of interference in said data channel's pilot signal;
    a switch unit outputting a first output of the interference power estimation unit when the number of pilot symbols in one slot of said data channel is smaller than a threshold value and outputting a second output of the data channel interference power calculation unit when the number of pilot symbols is larger than the threshold value; and
    a signal-to-interference power ratio (SIR) calculation unit calculating the SIR of the data signal based on any of the first output and the second output.

2. The wireless receiver estimating power of interference according to claim 1, wherein said interference power estimation unit multiplies the power of interference in the pilot signal by a quotient obtained by dividing a spread ratio of the data signal by the spread ratio of the common pilot signal and outputs the product as an estimate of an amount of interference in the data channel's pilot signal.

3. The wireless receiver estimating power of interference according to claim 1, further comprising
    a common pilot signal despreading unit despreading the common pilot signal using the spread ratio of the data signal,
wherein said interference power estimation unit obtains the power of interference in the common pilot signal using an output of the common pilot signal despreading unit.

4. A wireless receiver estimating power of interference in an incoming data signal, comprising:
    an interference power estimation unit obtaining power of interference in a common pilot signal and outputting the power of interference as an estimate of an amount of interference in a data channel's pilot signal;
    a data channel interference power calculation unit calculating power of interference in said data channel's pilot signal;
    a weight averaging unit weighting a first output of the interference power estimation unit when a number of pilot symbols in one slot of said data channel is smaller than a threshold value and weighting a second output of the data channel interference power calculation unit when the number pilot of symbols is larger than the threshold value, and averaging the first and the second weighted output; and
    a signal-to-interference power ratio calculation unit calculating an SIR of the data signal using an output of the weight averaging unit.

5. The wireless receiver estimating power of interference according to claim 4, wherein said interference power estimation unit multiplies the power of interference in the pilot signal by a quotient obtained by dividing a spread ratio of the data signal by a spread ratio of the common pilot signal and outputs the product as an estimate of an amount of interference in the data channel's pilot signal.

6. The wireless receiver estimating power of interference according to claim 4, further comprising
    a common pilot signal despreading unit despreading the common pilot signal using a spread ratio of the data signal,
    wherein said interference power estimation unit obtains the power of interference in the common pilot signal using an output of the common pilot signal despread unit.

7. A wireless receiver estimating power of interference in an incoming data signal, comprising:

interference power estimation means for obtaining power of interference in a common pilot signal and outputting the power of interference as an estimate of an amount of interference in a data channel's pilot signal;

data channel interference power calculation means for calculating power of interference in said data channel's pilot signal;

switch means for outputting a first output of the interference power estimation means when the number of pilot symbols in one slot of said data channel is smaller than a threshold value and outputting a second output of the data channel interference power calculation means when the number of pilot symbols is larger than the threshold value; and signal-to-interference power ratio (SIR) calculation means for calculating an SIR of the data signal based on any of the first output and the second output.

8. A wireless receiver estimating power of interference in an incoming data signal, comprising:

interference power estimation means for obtaining power of interference in a common pilot signal and outputting the power of interference as an estimate of an amount of interference in a data channel's pilot signal;

data channel interference power calculation means for calculating power of interference in said data channel's pilot signal;

weight averaging means for weighting a first output of the interference power estimation means when a number of pilot symbols in one slot of said data channel is smaller than a threshold value and weighting a second output of the data channel interference power calculation means when the number of pilot symbols is larger than the threshold value, and averaging the first and the second weighted output; and signal-to-interference power ratio calculation means for calculating an SIR of the data signal using an output of the weight averaging means.

* * * * *